US006650453B2

(12) United States Patent
Takase

(10) Patent No.: US 6,650,453 B2
(45) Date of Patent: Nov. 18, 2003

(54) MOUNTING MECHANISM FOR A STRAP MEMBER

(75) Inventor: Yoshiyuki Takase, Oyama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/228,135

(22) Filed: Aug. 27, 2002

(65) Prior Publication Data

US 2003/0053184 A1 Mar. 20, 2003

(30) Foreign Application Priority Data

Sep. 17, 2001 (JP) ....................................... 2001-281262

(51) Int. Cl.[7] ................................................ G02B 26/08
(52) U.S. Cl. ....................... 359/198; 359/223; 359/871; 359/872; 399/118; 399/126
(58) Field of Search ................................ 359/196, 198, 359/200, 223, 226, 871, 872; 248/466, 475.1, 476–480; 358/474; 347/242, 245, 257, 263; 399/118, 126

(56) References Cited

U.S. PATENT DOCUMENTS 4,862,218 A * 8/1989 Tsunoda et al. ............ 399/118

FOREIGN PATENT DOCUMENTS

| | | |
|---|---|---|
| JP | 5-33108 | 4/1993 |
| JP | 6-148490 | 5/1994 |
| JP | 2001356259 A | * 12/2001 |

* cited by examiner

*Primary Examiner*—James Phan
(74) *Attorney, Agent, or Firm*—Arnold International; Jon W. Henry; Bruce Y. Arnold

(57) ABSTRACT

A mounting mechanism is disclosed for a strap member in which the orientation of a surface of the strap member, such as a reflecting mirror, is adjustable. In particular, the strap member may be a cylindrical mirror for reflecting light beams to image carriers such as sensitized drums on which images are recorded in an optical reproductive scanning apparatus. The mounting mechanism allows the strap member to be readily fixed in position without causing positional changes of the strap member that would change the magnification and/or cause skew changes in scanning lines when the strap member is a cylindrical mirror in an optical scanning apparatus.

20 Claims, 15 Drawing Sheets

MOUNTING MECHANISM FOR A STRAP MEMBER

BACKGROUND OF THE INVENTION

In an optical reproductive scanning apparatus used in a copier or a printer, a laser beam, including image information emitted from a laser source and appropriately modulated, enters a deflection system such as a polygon mirror, and then the deflected laser beam is projected onto an image carrier such as a sensitized drum to form an electrostatic latent image thereon. The electrostatic latent image is developed using toner to create a toner image which, in turn, is transferred to a transfer medium such as a recording chart to form an image. Well-known color image forming devices such as color copiers and color printers include a tandem-type image forming device in which plural image carriers such as sensitized drums are juxtaposed. Laser beams including yellow (Y), magenta (M), cyan (C), and black (BK) image data are separately scanned over the image carriers to create latent images. Then, the latent images are developed using toners. Toner images are transferred to a transfer medium such as a recording material moving along the juxtaposed image carriers to create a color image. The direction in which an electrostatic latent image is formed using a deflection device, such as a polygon mirror, is termed the main scanning direction and the direction in which an electrostatic latent image is formed by rotating a sensitized drum or an image carrier is termed the sub-scanning direction.

In order to ensure clearly formed images using multiple scanning beams, the scanning beams need to maintain precise optical properties, which is based on the scanning apparatus maintaining its scanning properties. To ensure the desired optical and scanning properties, an optical reproductive scanning apparatus should include optical elements mounted with high precision and mounted for high precision movement. A slight shift in the reflecting direction of the reflecting mirror or changes in the mounting condition of the reflecting mirror may impair the optical and scanning properties. Therefore, the reflecting direction of the reflecting mirror should be adjusted with high precision. When the reflecting mirror that reflects scanning light reflected by a polygon mirror has an elongated shape, such as a strap, is supported at both ends and is movable over a scanning range, changes in mounting conditions at one of the ends may cause the entire reflecting surface to undergo an undesired movement, causing an undesired change in the reflected light. Therefore, both ends should be mounted and adjusted with high precision.

Conventional adjusting mechanisms for such reflecting mirrors include, for example, a mirror adjusting mechanism as described in the Japanese Laid-Open Patent Application No. H5-33108. This mirror adjusting mechanism comprises bearing members at the ends of a mirror frame that can abut against the reflecting surface of a mirror. The bearing member is provided with an adjuster plate that is rotatably mounted thereon and can abut against the reflecting surface of a mirror. The adjuster plate is provided with an adjusting member to adjust its rotation. In addition, an urging member is provided that abuts against the back of the mirror frame so as to press on the mirror. The adjusting member is adjusted to rotate the adjuster plate, which causes the mirror to swing about a longitudinal axis of the mirror, changing the orientation of the reflecting surface.

Japanese Laid-Open Utility Model Application No. H6-148490 describes an optical member holding mechanism of a beam scanning optical system. This optical member holding mechanism has a structure in which holes and a small projection are formed in the side boards of a housing for an optical device. Both ends of a flat mirror are loosely fitted in the holes. Press plates are fixed to side boards of the mechanism from the outside so that they are free to rotate about points that are different from points defined by fixing screws. Press pieces provided on the press plates abut against the back of the mirror. The press plates are fixed to the side boards by the fixing screws and the press plates are rotated to adjust the inclination of the mirror by a combination of an elongated hole formed in the press plate and an eccentric pin that is rotated.

In optical reproductive scanning devices, the final mirror that reflects light to the image carrier of an optical reproductive scanning device is, in some cases, an elongated cylindrical mirror. A cylindrical mirror is used in order to provide a magnified image of a desired magnification to the image carrier. The cylindrical mirror may undergo changes in the magnification at the surface of the image carrier when it shifts in the normal direction, that is, in a direction that changes the optical path length between the cylindrical mirror and the image carrier. Additionally, the entrance point to the image carrier may change when the cylindrical mirror rotates about an axis parallel to the center of curvature of the cylindrical mirror. Further, the main scanning line may shift during rotation of the cylindrical mirror due to misalignment of the end pivots of the cylindrical mirror. Therefore, the cylindrical mirror requires adjustments for the position in the normal direction (hereinafter termed “magnification adjustment”), the entrance point by the rotation angle (hereinafter termed “registering adjustment”), and the relative positions of the both ends (hereinafter termed “skew adjustment”). This mounting mechanism for a cylindrical mirror also uses a conventional mirror adjustment mechanism and an optical member holding mechanism.

The mirror adjustment mechanism described in the Japanese Laid-Open Utility Model Application No. H5-33108 rotates an adjuster plate that is in direct contact with the mirror. The adjuster plate is provided at one or both ends of the mirror. The mirror may be subject to distortion such as twisting or bending, depending on how the adjustment is performed. When the adjuster plate is provided at one end, the other end is restrained with a certain force. Therefore, when the adjuster plate is rotated to press and move the one end, the mirror may be bent or twisted. When adjuster plates are provided at both ends, adjustment should be performed on both ends, which makes the adjustment operation complicated and requires balanced adjustments in order to prevent mirror distortion.

An optical member retaining mechanism as described in the Japanese Laid-Open Patent Application No. H6-148490 uses press boards that are in contact with both ends of a mirror and serve as leaf springs to resiliently press the back of the mirror. Similarly to the mirror adjustment mechanism described in the preceding paragraph, the mirror may be distorted by bending or twisting due to the force of a press board pressing against one of the ends.

As described above, conventional mirror adjustment mechanisms and optical member retaining mechanisms require complicated mechanisms and processes for mounting and adjusting a cylindrical mirror. For example, when brackets are used, the brackets for mounting the mirror may slide to adjust the magnification, and adjuster plates or press boards may rotate to adjust registering and skew. Therefore, if the adjuster plates or press boards are rotated for the skew adjustment after the registering adjustment is completed, the position is lost and the registering adjustment must be repeated. Then, the registering and skew adjustments are repeated until a desired optical performance is obtained. This makes the adjustment operation difficult and time consuming, especially for inexperienced operators.

In view of the problems discussed above, the present applicant previously proposed a mounting and adjusting mechanism for a strap member that allows for mounting of a strap-shaped optical member, such as a mirror or lens, with the reflecting direction precisely adjusted and without distortion of the optical member, as set forth in Japanese Patent Application No. 2000-176901 (which corresponds to Japanese Laid Open Application No. 2001-356259). That mechanism allows for easy and reliable adjustment and movement of an optical member, such as a cylindrical mirror, in multiple directions.

As disclosed in that application, a cylindrical mirror is housed in a mirror holder that has at least one open side, with the reflecting surface of the cylindrical mirror being exposed through the open side. Bearing shafts are provided at both ends of the mirror holder, protruding from the mirror holder in the longitudinal direction of the cylindrical mirror. Retainer plates are loosely fitted on the respective bearing shafts, with the retainer plates being free to slide relative to the surfaces of frames on which the cylindrical mirror is mounted in a direction orthogonal to the bearing shafts. One of the retainer plates is a captive retainer plate that is loosely fitted on one of the bearing shafts with an appropriate clearance. The other retainer plate is loosely fitted on the other bearing shaft with an appropriate clearance so that it is free to be at a biased position. An engaging adjuster plate is detachably linked to the end of the bearing shaft that protrudes outward from the captive retainer plate. The engaging adjuster plate is rotatable relative to the captive retainer plate so as to rotate the mirror holder about the bearing shaft. An operational adjuster plate is linked to the end of the bearing shaft that protrudes outward from the other loosely fitted retainer plate. The operational adjuster plate is free to slide relative to the other loosely fitted retainer plate in a direction orthogonal to the normal of the cylindrical mirror, and both of the retainer plates are free to slide relative to the frames in the direction of the normal of the cylindrical mirror.

The retainer plates are slid relative to the frames for the magnification adjustment. The engaging adjuster plate is rotated relative to the captive retainer plate for the registering adjustment. The operational adjuster plate is slid relative to the loosely fitted retainer plate for the skew adjustment. These adjustments can be performed independently. Therefore, one adjustment is not necessarily done again after another, greatly facilitating the adjustment operation.

The operational retainer plate is loosely fitted on the bearing shaft to ensure a smooth rotation of the bearing shaft during registering adjustment. Without the smooth rotation, registering adjustment would be unreliable. However, this looseness may cause the bearing shaft to shift in relation to the operational adjuster plate due to vibrations and heating that occur during the operation of a copier or printer.

If this shift occurs after the skew and registering adjustments are done, imaging problems may occur, such as blurred colors in transferred images in a color copier. Therefore, the operational adjuster plate has a structure as shown in FIG. 16. As shown in FIG. 16, a clamp ring 50 having a cut part, or gap, where overlapping protrusions 51 are provided is prepared. The bearing shaft 52 is fitted within the clamp ring 50. A setscrew 53 is tightened through holes in the overlapping protrusions 51 so as to draw the protrusions closer together and thus hold the bearing shaft 52. After the registering adjustment, when the setscrew is tightened to fix the bearing shaft 52 in the clamp ring 50, the bearing shaft 52 may shift within the clamp ring 50. This may cause undesired changes in the skew adjustment that has already been performed. For this reason, the structure in FIG. 16 is not ideal.

BRIEF SUMMARY OF THE INVENTION

The present invention relates to a mounting mechanism for a strap member in which the orientation of a surface of the strap member, such as a reflecting mirror, is adjustable. In particular, the strap member may be a cylindrical mirror for reflecting light beams to image carriers such as sensitized drums on which images are recorded in an optical reproductive scanning apparatus.

An object of the invention is to provide a mounting mechanism for a strap member in which the strap member can be readily fixed in position without causing positional changes of the strap member that would change the magnification and/or cause skew changes in scanning lines when the strap member is a cylindrical mirror in an optical scanning apparatus.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
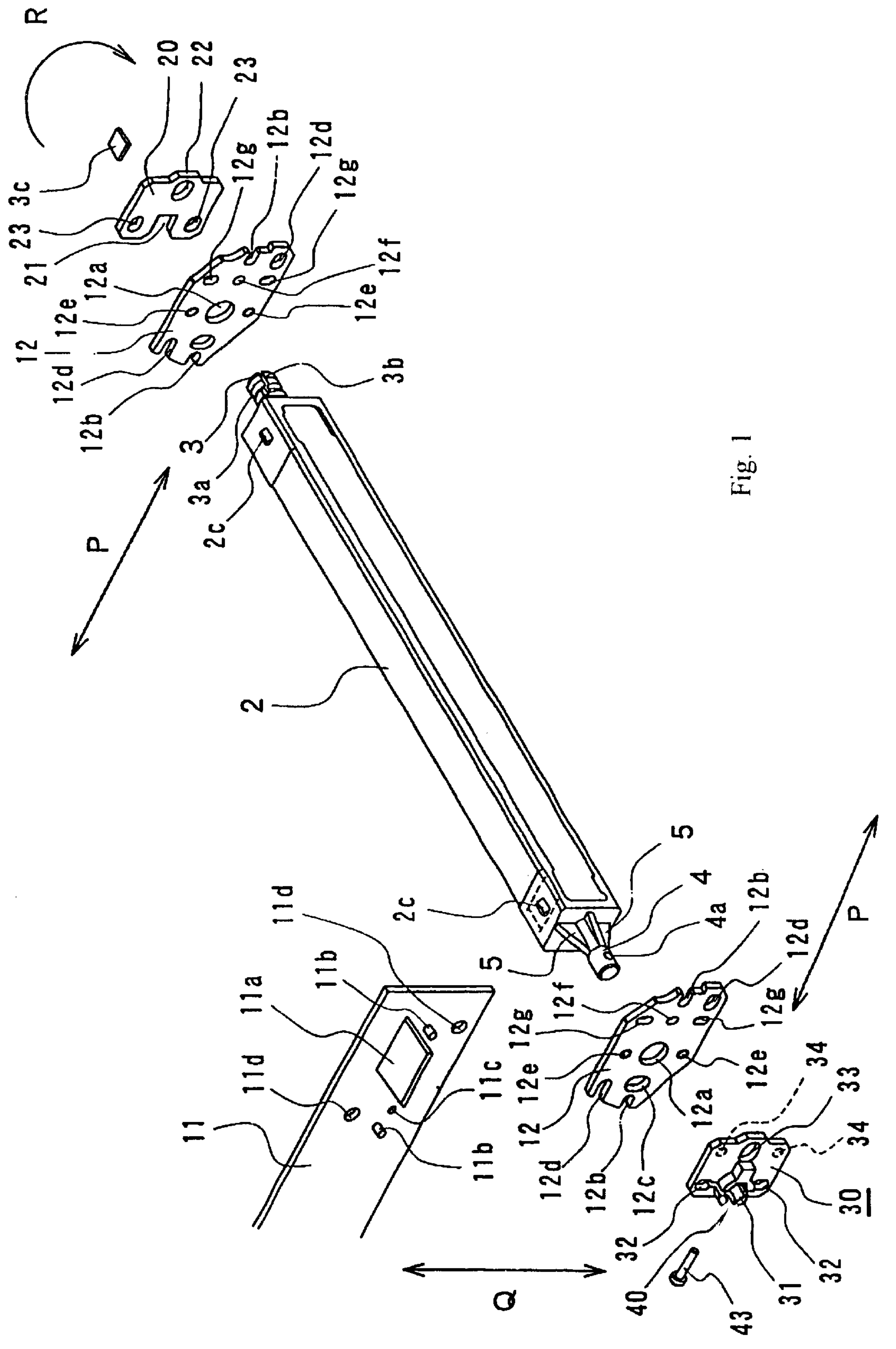
FIG. 1 is a perspective view of the mounting mechanism of the present invention as seen in one direction before assembly.

A preferred embodiment of the mounting mechanism for a strap member of the present invention is hereinafter described, as shown in the drawings. In the preferred embodiment, the strap member is a cylindrical mirror used in an optical reproductive scanning apparatus. The mounting mechanism allows magnification, registering and skew adjustments.

Figure 8:
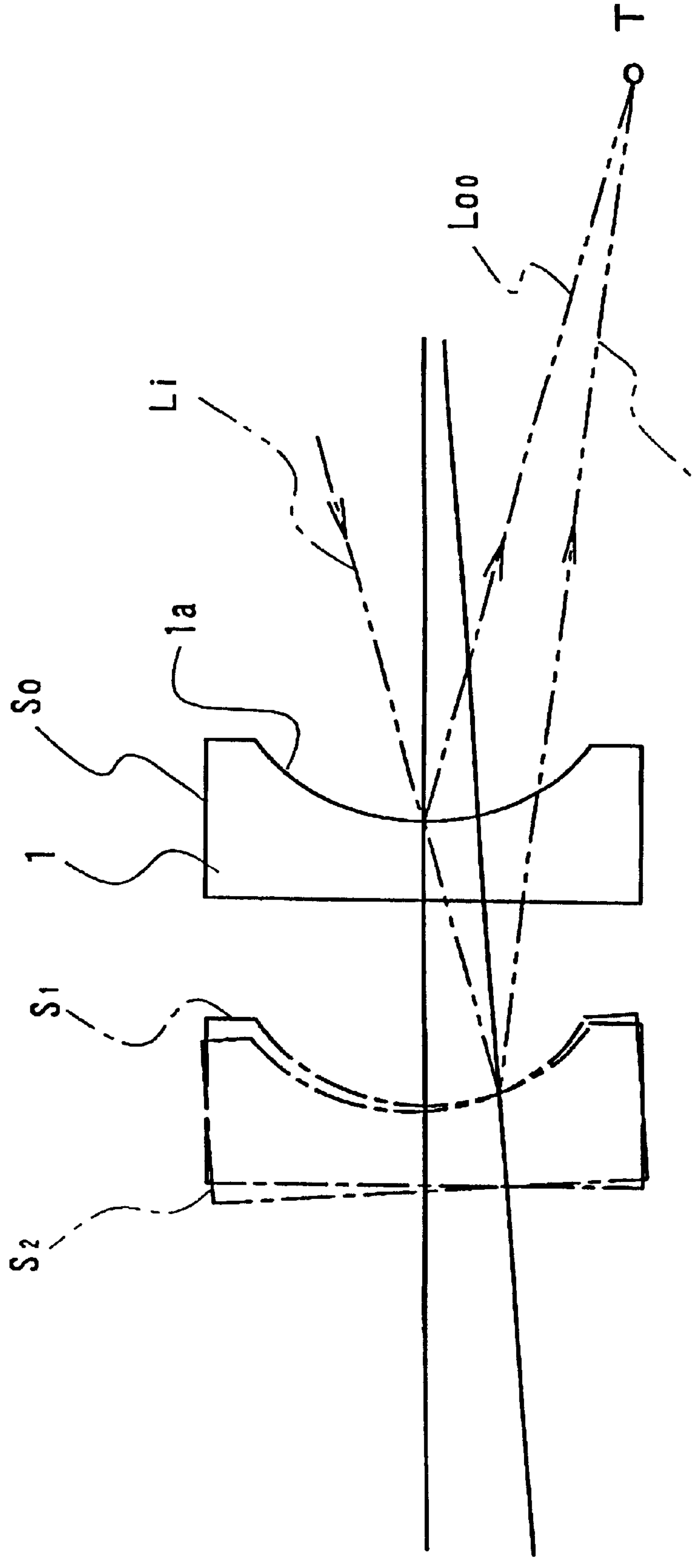
FIG. 8 is an illustration showing the relationship between incident and reflected light rays at the cylindrical mirror before and after a sliding movement of the cylindrical mirror.
Figure 10:
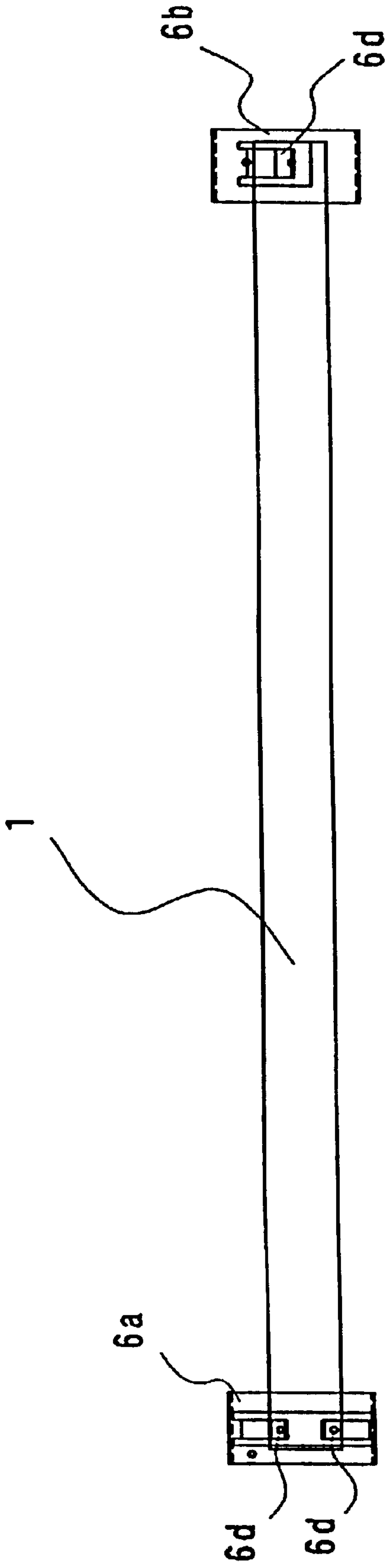
FIG. 10 is a plan view of the cylindrical mirror as a strap member that is mounted and adjusted using the mounting mechanism of the present invention.
Figure 11:
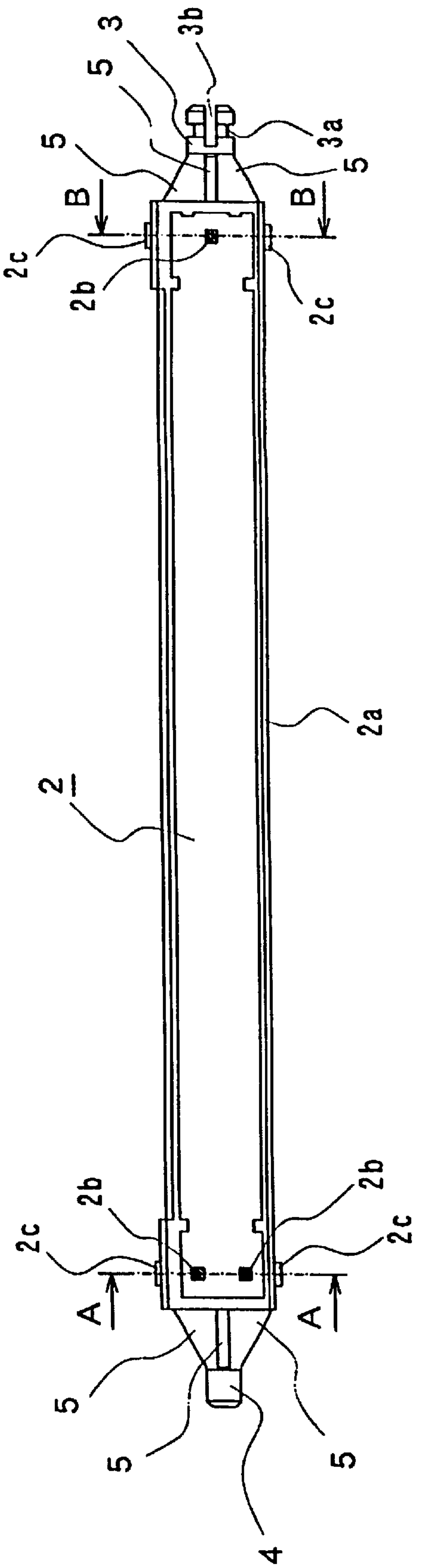
FIG. 11 is a plan view of a mirror case that houses the cylindrical mirror as a strap member that is mounted and adjusted using the mounting mechanism of the present invention.

As shown in FIG. 10, a cylindrical mirror 1 is formed in the shape of an elongated strap in which the direction of elongation coincides with the main scanning direction of an optical reproductive scanning device. As shown in FIG. 8, the cylindrical mirror 1 has a surface 1*a* that is cylindrical in the center for scanning and substantially flat at both ends. As shown in FIGS. 11 to 15, the cylindrical mirror 1 is housed in a case, such as a mirror holder 2. The mirror holder 2 includes a holder part 2*a* that has a substantially rectangular box shape in cross section, is almost as long as the cylindrical mirror 1, and is open on one of the lengthwise sides. As shown in FIG. 11, mirror receiving parts 2*b*, each including a projection, are provided at both ends of the bottom plate of the holder part 2*a*. Two projections are provided at one end and one is provided at the other end so that the cylindrical mirror 1 is supported at three points. Spring engaging parts 2*c*, each including a projection, are provided at the ends of the external side wall of the holder part 2*a*. A bearing shaft 3 is provided at one end of the holder part 2*a* and a bearing shaft 4 is provided at the other end. The bearing shaft 3 has a larger outer diameter than the bearing shaft 4. An engaging part 3*a* is formed in the center of the bearing shaft 3 by making three sides of the bearing shaft flat in this region. As shown in FIG. 11, an axially extending notch 3*b* having an appropriate depth is formed at the tip of the bearing shaft 3. The mirror holder 2 can be made by integrally molding synthetic resin so as to form the holder part 2*a* and bearing shafts 3 and 4. Ribs 5 are provided for assisting in the connection between the holder part 2*a* and the bearing shafts 3 and 4.

Figure 12:
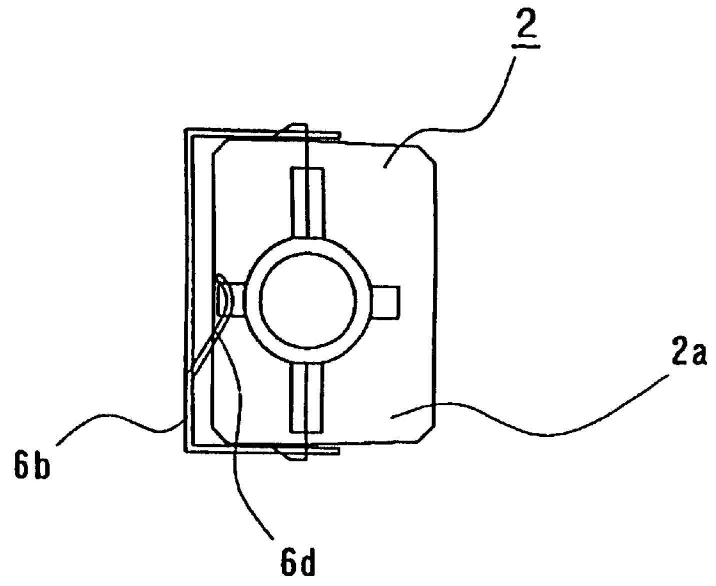
FIG. 12 is a right side view of the mirror holder in FIG. 11.
Figure 13:
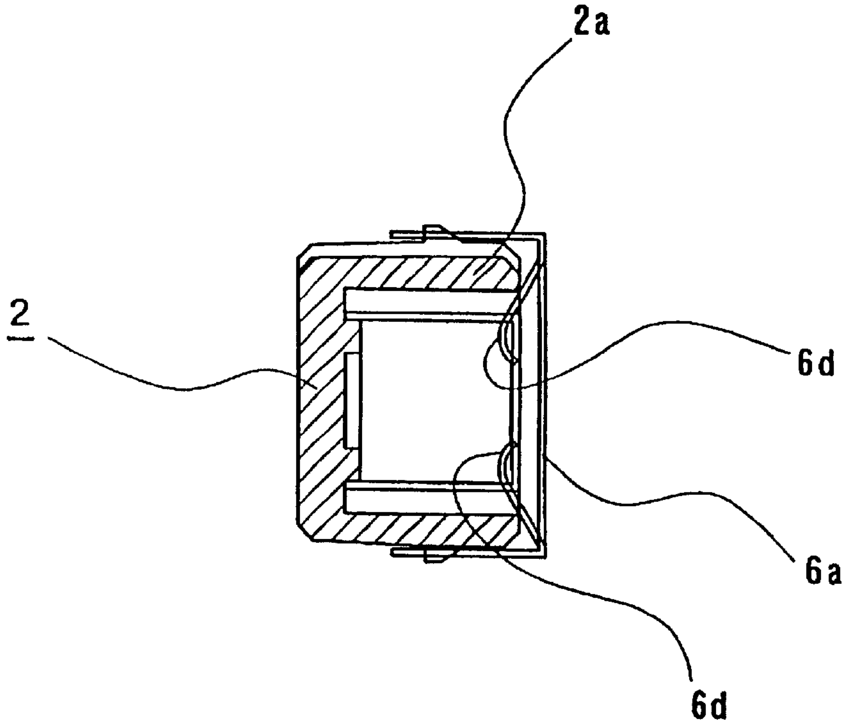
FIG. 13 is a section view along the line A—A in FIG. 11.
Figure 14:
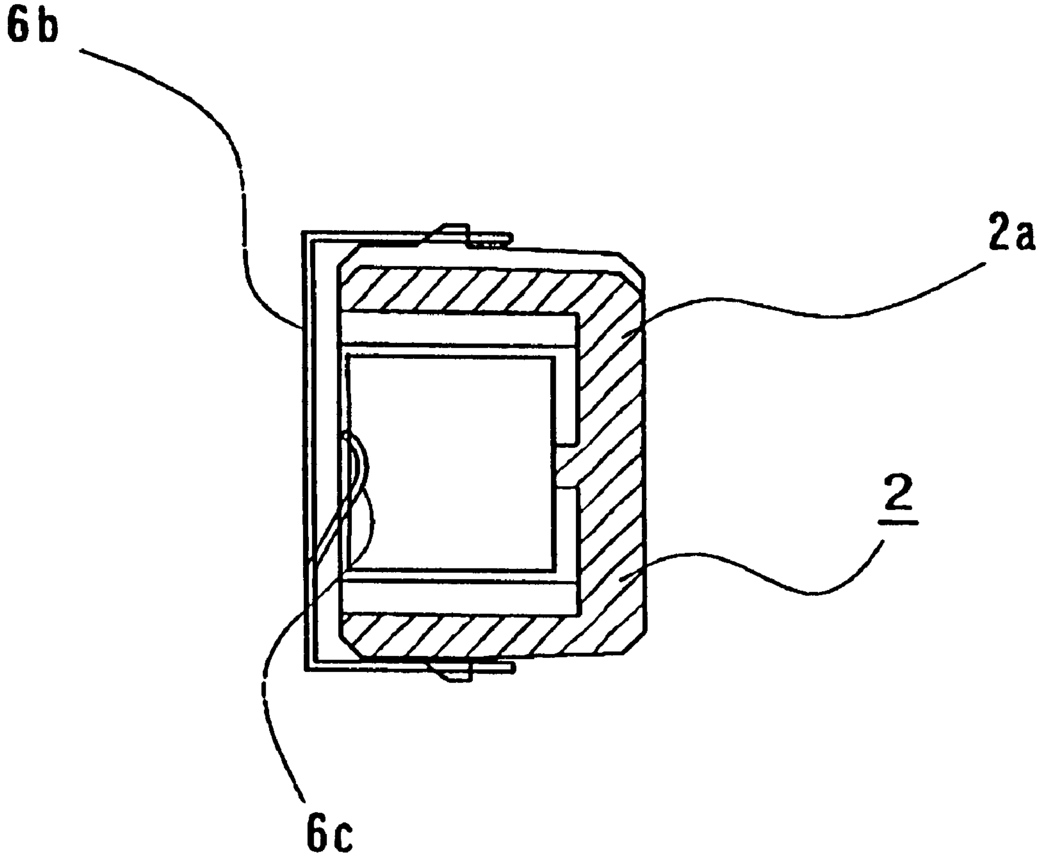
FIG. 14 is a section view along the line B—B in FIG. 11.
Figure 15:
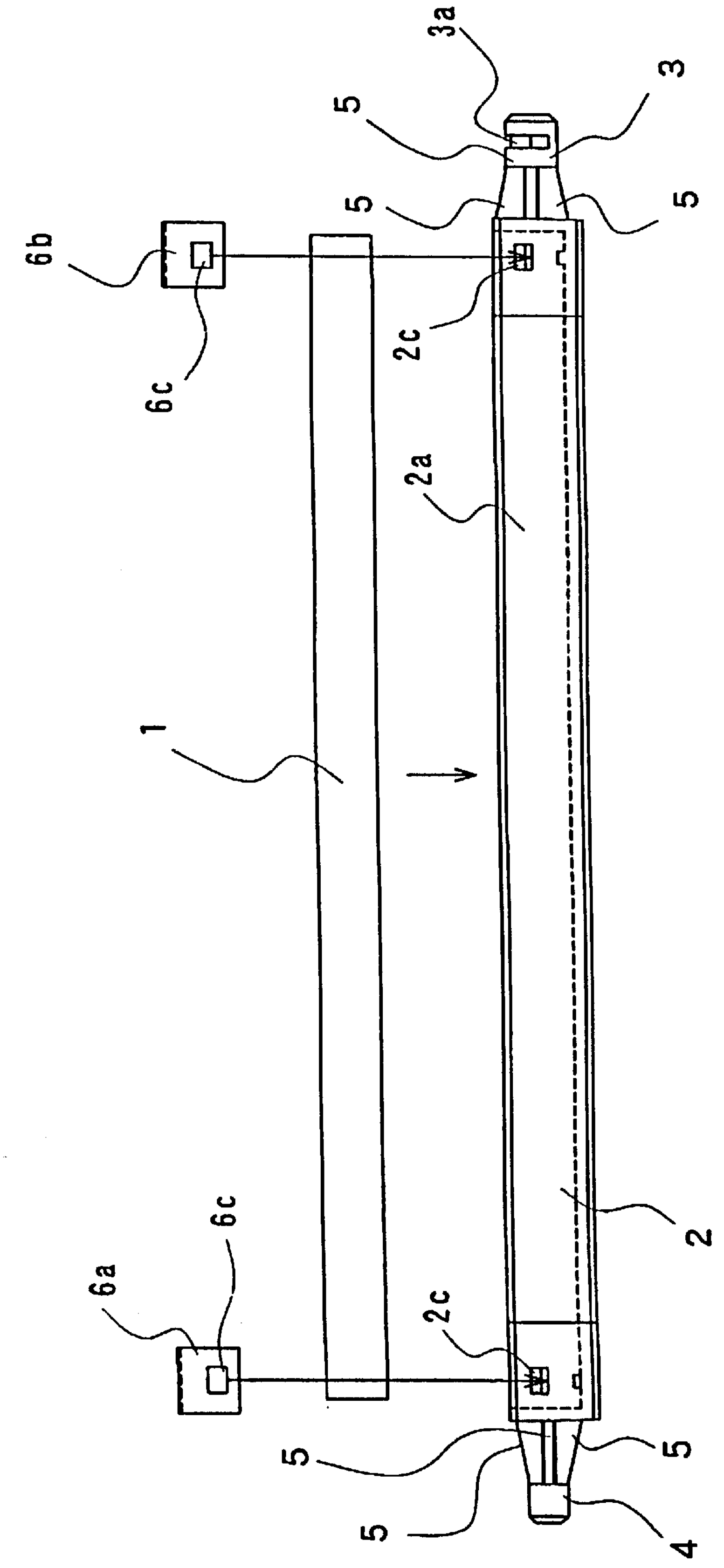
FIG. 15 is an exploded view showing the process of housing the cylindrical mirror in the case illustrated in FIG. 11.
Figure 16:
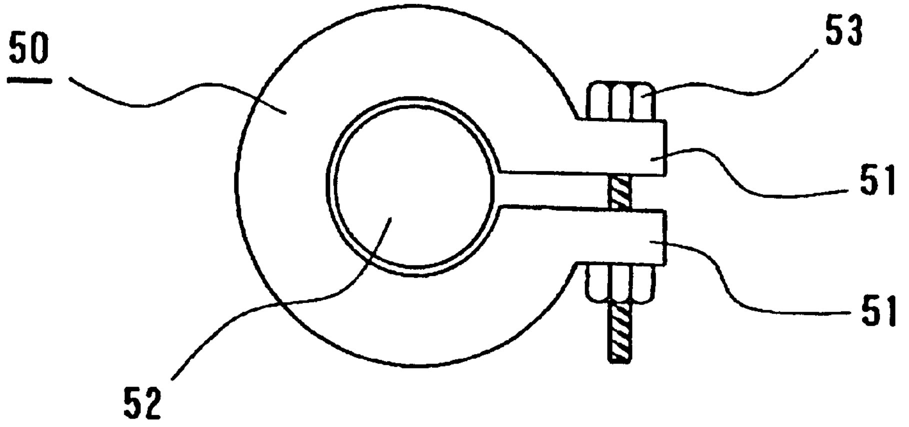
(PRIOR ART) Fig. 16
FIG. 16 is a front view showing a prior art structure used for fixing a bearing shaft.

The cylindrical mirror 1 is housed in the holder part 2*a* of the mirror holder 2 with the reflecting surface of the cylindrical mirror 1 exposed through the opening of the holder part 2*a*. Referring to FIG. 10, mirror pressing springs 6*a* and 6*b* are provided at the both ends of the cylindrical mirror 1. Each of the mirror pressing springs 6*a* and 6*b* is made of a metal plate bent into a channel shape, as illustrated. As shown in FIG. 15, the leg parts of each of the channel-shaped plates have a substantially rectangular through-hole 6*c*. The body part of each of the channel-shaped plates includes at least one spring pressing projection 6*d* cut and bent out of the plane of each of the body parts. The spring pressing projections 6*d* protrude inwardly of the channel-shaped plates. Referring to FIGS. 12–13, the mirror pressing spring 6*a* has two spring pressing projections 6*d* and the mirror pressing spring 6*b* has one spring pressing projection 6*d*. As is shown in FIG. 15, the cylindrical mirror 1 housed in the holder part 2*a* is pressed by these mirror pressing springs 6*a* and 6*b*. The through-holes 6*c* of the mirror pressing springs 6*a* and 6*b* engage with the spring engaging parts 2*c*, preventing the mirror pressing springs 6*a* and 6*b* from being released. The spring pressing projections 6*d* abut against the flat end surfaces of the cylindrical mirror 1. Thus, the cylindrical mirror 1 is supported at three points. Appropriate recesses in the mirror receiving parts 2*b* may be formed to create a spring abutting part where the spring pressing projections 6*d* abut against the cylindrical mirror 1. The mirror pressing spring 6*a*, having two spring pressing projections 6*d*, is mounted at the end where two of the mirror receiving parts 2*b* is positioned, and the mirror pressing spring 6*b*, having one spring pressing projection 6*d*, is mounted at the end where one mirror receiving part 2*b* is positioned.

Figure 7:
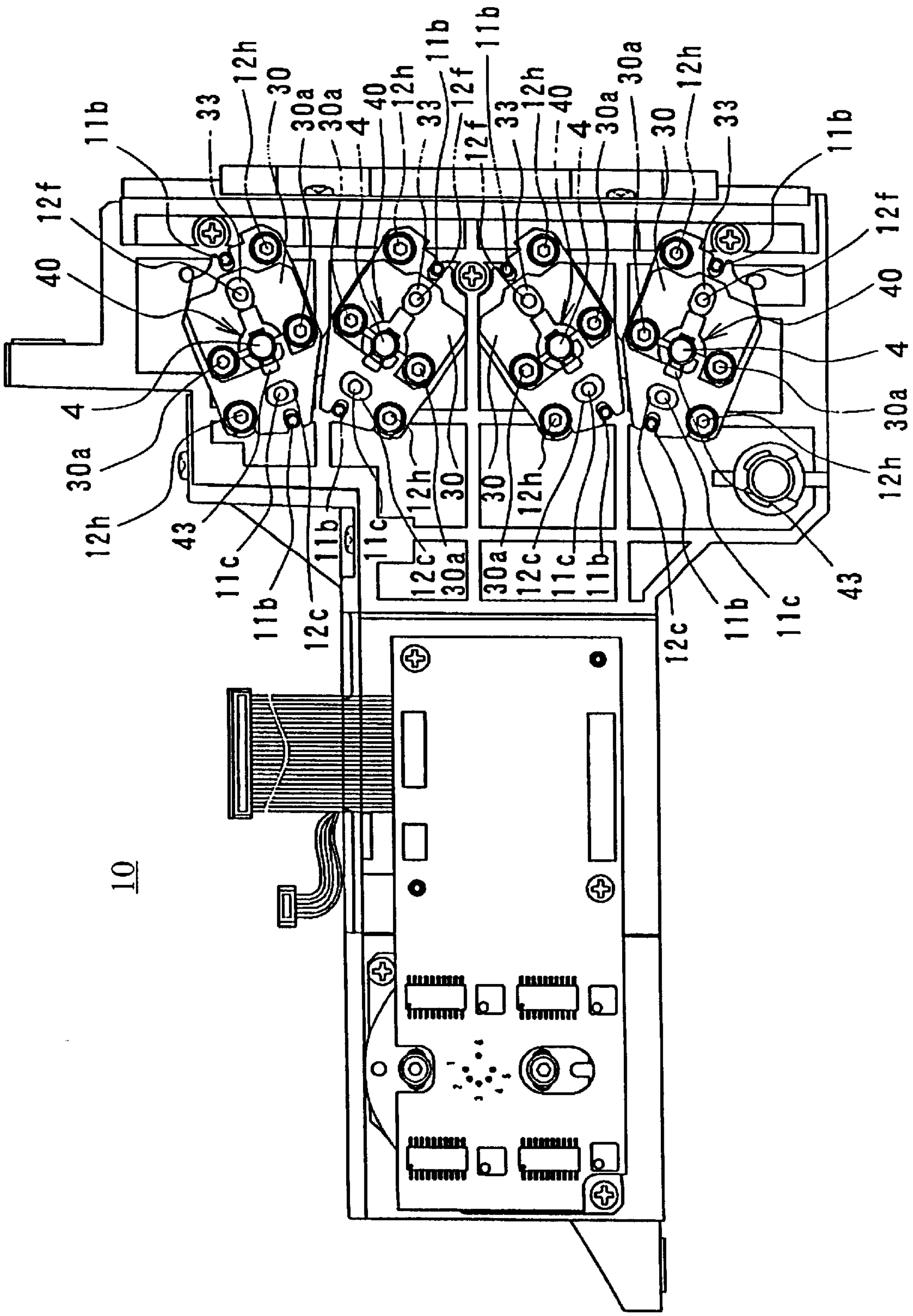
FIG. 7 is a side view showing an optical reproductive scanning apparatus with cylindrical mirrors that have been mounted using the mounting mechanism of the present invention.

FIG. 7 is a side view of an optical reproductive scanning apparatus with four cylindrical mirrors housed in mirror holders. FIG. 1 shows the mounting mechanism in an exploded perspective view before assembly. A frame 11 may be provided when the cylindrical mirror 1 is mounted in the optical reproductive scanning apparatus 10. Alternatively, the side wall itself of the casing of the optical reproductive scanning apparatus 10 can be used as the frame, as shown in FIG. 7. For convenience of illustration, FIG. 1 only shows frame 11 at bearing shaft 4, but frame 11 is arranged to similarly engage bearing shaft 3. The frame 11 has a through-hole 11*a* through which the mirror holder 2 is inserted. A pair of guide projections 11*b* are provided on both sides of the through-hole 11*a*, as will be discussed later. A guide hole 11*c* is formed on the line connecting these guide projections 11*b*. A pair of threaded holes 11*d* are formed on both sides of the through-hole 11*a*.

When the mirror holder 2 is placed between the frames 11 and through the through-holes 11*a*, the bearing shafts 3 and 4 of the mirror holder 2 protrude outward from the frames 11. Retainer plates 12 are engaged with the bearing shafts 3 and 4 at the outside of the frames 11. Identical retainer plates 12 are engaged with bearing shafts 3 and 4. Each retainer plate 12 has a bearing hole 12*a* in the center for receiving bearing shaft 3 or 4. Each bearing hole 12*a* has an inner diameter of a size so that the bearing shaft is free to rotate guided by the bearing hole 12*a*. The bearing shaft 4 has a smaller diameter than the bearing shaft 3. Therefore, the bearing shaft 4 can be shifted in the bearing hole 12*a* and is free to be biased to a position off-center from the center of the bearing hole 12*a*. The retainer plate 12 fitted on the bearing shaft 3 is a captive retainer plate and the retainer plate fitted on the bearing shaft 4 is a loosely fitted retainer plate.

Each retainer plate 12 has a pair of notches 12*b* to receive the guide projections 11*b* with play. The guide projections 11*b* are loosely fitted in the notches 12*b* when the retainer plates 12 are mounted on the bearing shaft 3 and 4. The notches 12*b* are elongated in the direction of the line connecting the two guide projections 11*b*. Therefore, each retainer plate 12 can slide in the direction of the line connecting the two guide projections 11*b*. Furthermore, an elongated positioning hole 12*c* that is elongated in the direction orthogonal to the line connecting the notches 12*b* is formed at a position aligned with the guide hole 11*c* when the retainer plate 12 abuts against the frame 11. The elongated positioning hole 12*c* also has a larger width than the inner diameter of the guide hole 11*c*. The line connecting the guide projections 11*b* passes through the center of the bearing hole 12*a*. Therefore, the bearing hole 12*a*, notches 12*b*, and elongated positioning hole 12*c* have their respective centers almost on the same line. The retainer plate 12 also has through-parts 12*d* that have appropriately larger widths or inner diameters than the nominal diameter of the threaded holes 11*d*. One of the through-parts 12*d* is formed as an elongated hole and the other as a notch.

The retainer plate 12 has a pair of threaded holes 12*e* formed on opposite sides of bearing hole 12*a* along a line passing through the center of bearing hole 12*a* and orthogonal to the line connecting the notches 12*b*. A guide hole 12*f* is formed on the side of the bearing hole 12*a* opposite the elongated positioning hole 12*c* and on the line connecting the notches 12*b*. A pair of elongated holes 12*g* are formed on opposite sides of guide hole 12*f* along a line passing through the center of guide hole 12*f* and orthogonal to the line connecting the notches 12*b*.

The tip part of the bearing shaft 3 protrudes outwardly from the captive retainer plate 12, and an engaging adjuster plate 20 is mounted on this tip part. The tip part of the bearing shaft 4 protrudes outwardly from the loosely fitted retainer plate 12, and an operational adjuster plate 30 is mounted on this protruding tip part.

Figure 2:
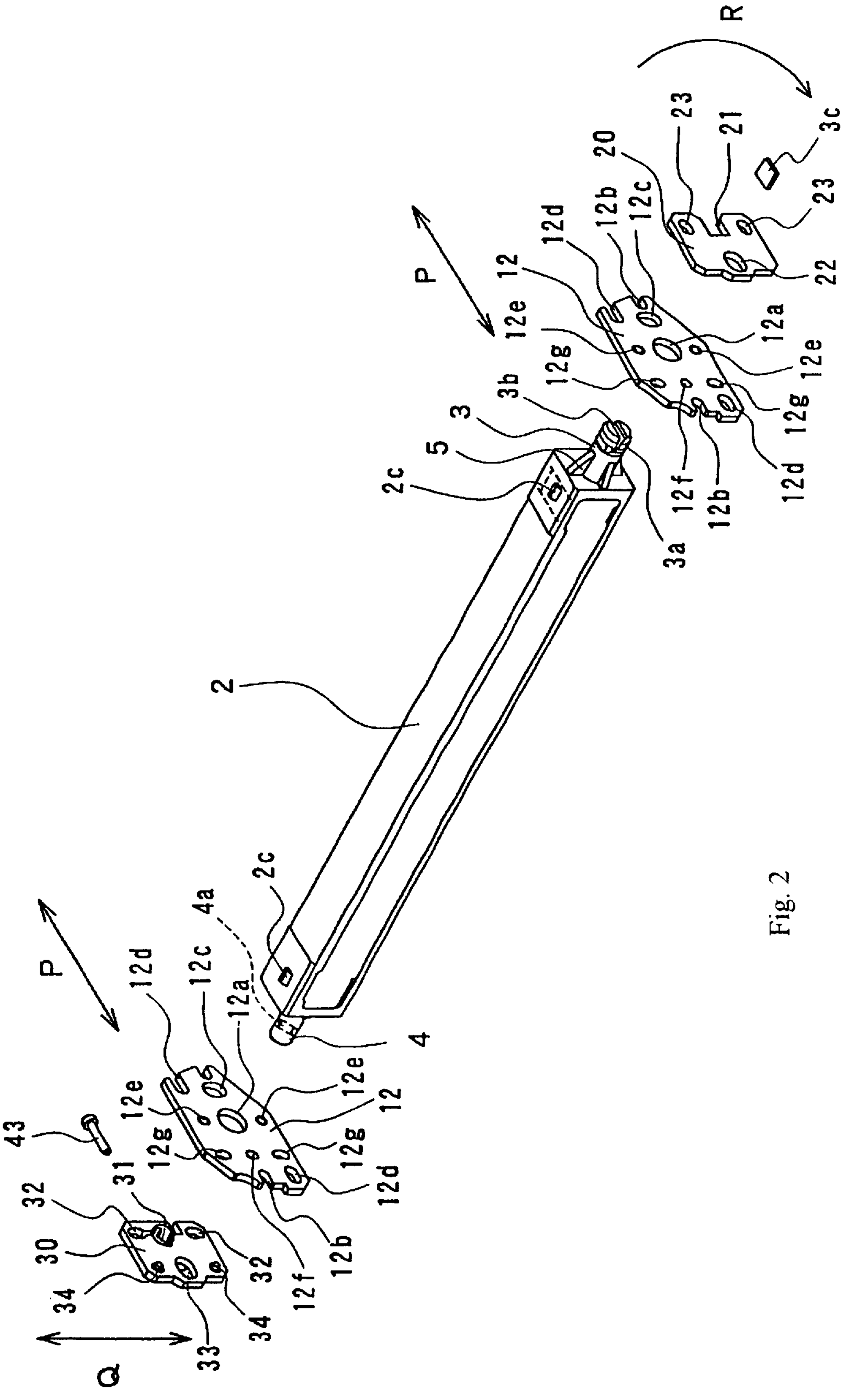
FIG. 2 is a perspective view of the mounting mechanism in FIG. 1 as seen in another direction before assembly.

The engaging adjuster plate 20 is a metal plate, and, as shown in FIGS. 1 and 2, has a substantially rectangular shape with a notch 21 in the center of one side. The notch 21 has a substantially rectangular shape, two parallel surfaces which are separated by about the same distance as the two parallel surfaces of the engaging part 3*a* of the bearing shaft 3. The engaging part 3*a* is inserted in and engaged with the notch 21. With the notch 21 engaging the engaging part 3*a*, the engaging adjuster plate 20 is pivoted to rotate the bearing shaft 3 and, accordingly, the mirror holder 2. An elongated hole 22 is formed in the engaging adjuster plate 20 at a position aligned with the guide hole 12*f* of the retainer plate 12 when the engaging part 3*a* is engaged with the notch 21. The elongated hole 22 is centered on the line bisecting notch 21 along its longer dimension, and the hole is elongated along that line. The elongated hole 22 also has an appropriately larger width than the inner diameter of the guide hole 12*f*. Elongated fixing holes 23, elongated in the same direction as the elongated hole 22, are formed at positions aligned with threaded holes 12*e* of retainer plate 12 when the engaging part 3*a* is engaged with the notch 21.

The operational adjuster plate 30, made of metal and having a substantially rectangular shape, includes a receiving hole 31 that receives the bearing shaft 4 with clearance. Therefore, the operational adjuster plate 30 can be rotated relative to the bearing shaft 4. Elongated fixing holes 32, elongated in the direction of the line connecting the threaded holes 12*e*, are formed at positions aligned with the threaded holes 12*e* of the loosely fitted retainer plate 12 when the bearing shaft 4 is received in the receiving hole 31. An elongated hole 33 that is elongated in the direction orthogonal to the line connecting the elongated fixing holes 32 is formed at a position aligned with the position of the guide hole 12*f* of the loosely fit retainer plate 12 when the bearing shaft 4 is received in the receiving hole 31. Additionally, guide projections 34 are positioned to loosely fit in the elongated holes 12*g*.

Figure 3:
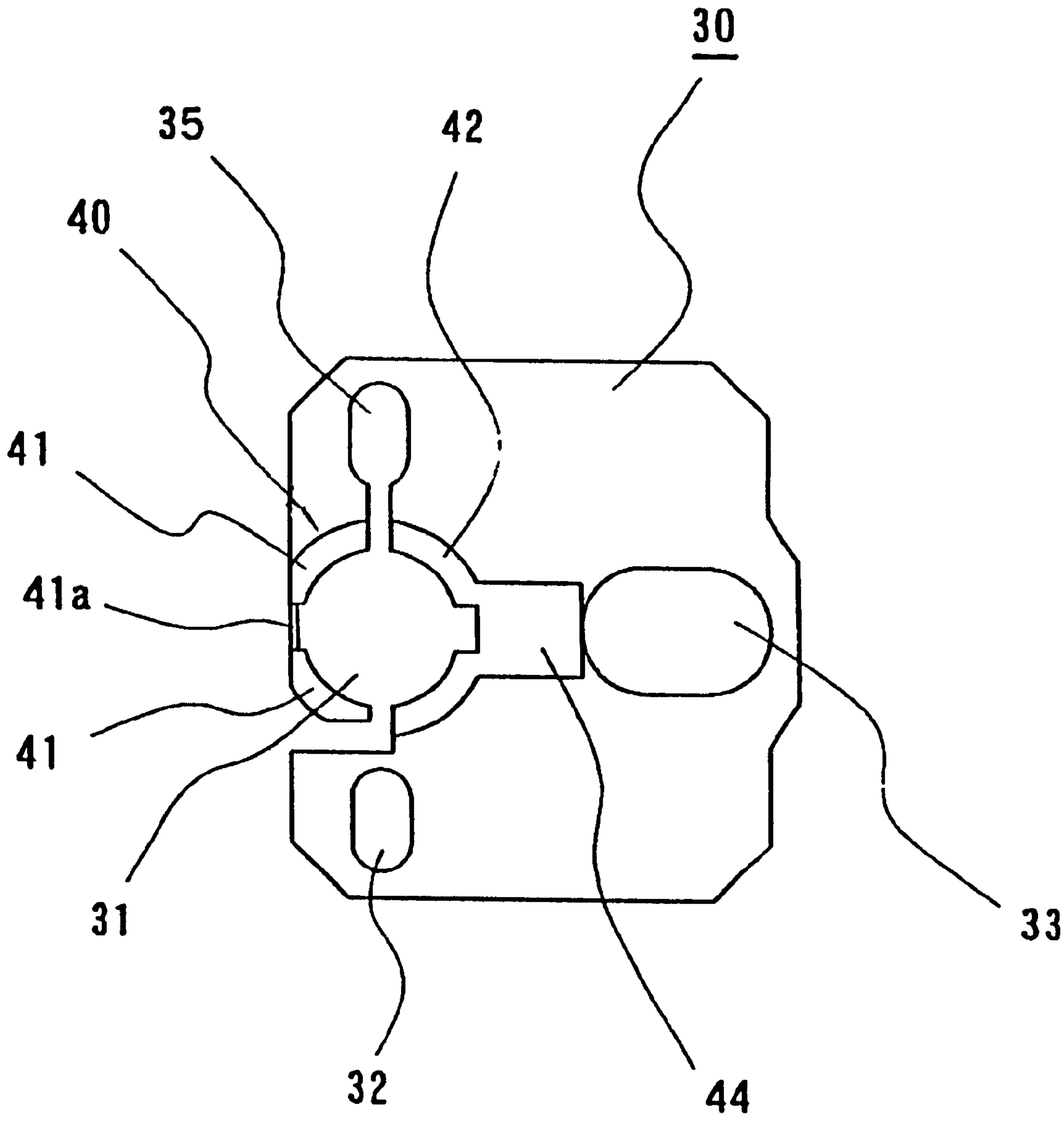
FIG. 3 is a front view of the operational adjuster plate of the mounting mechanism of the present invention.
Figure 4:
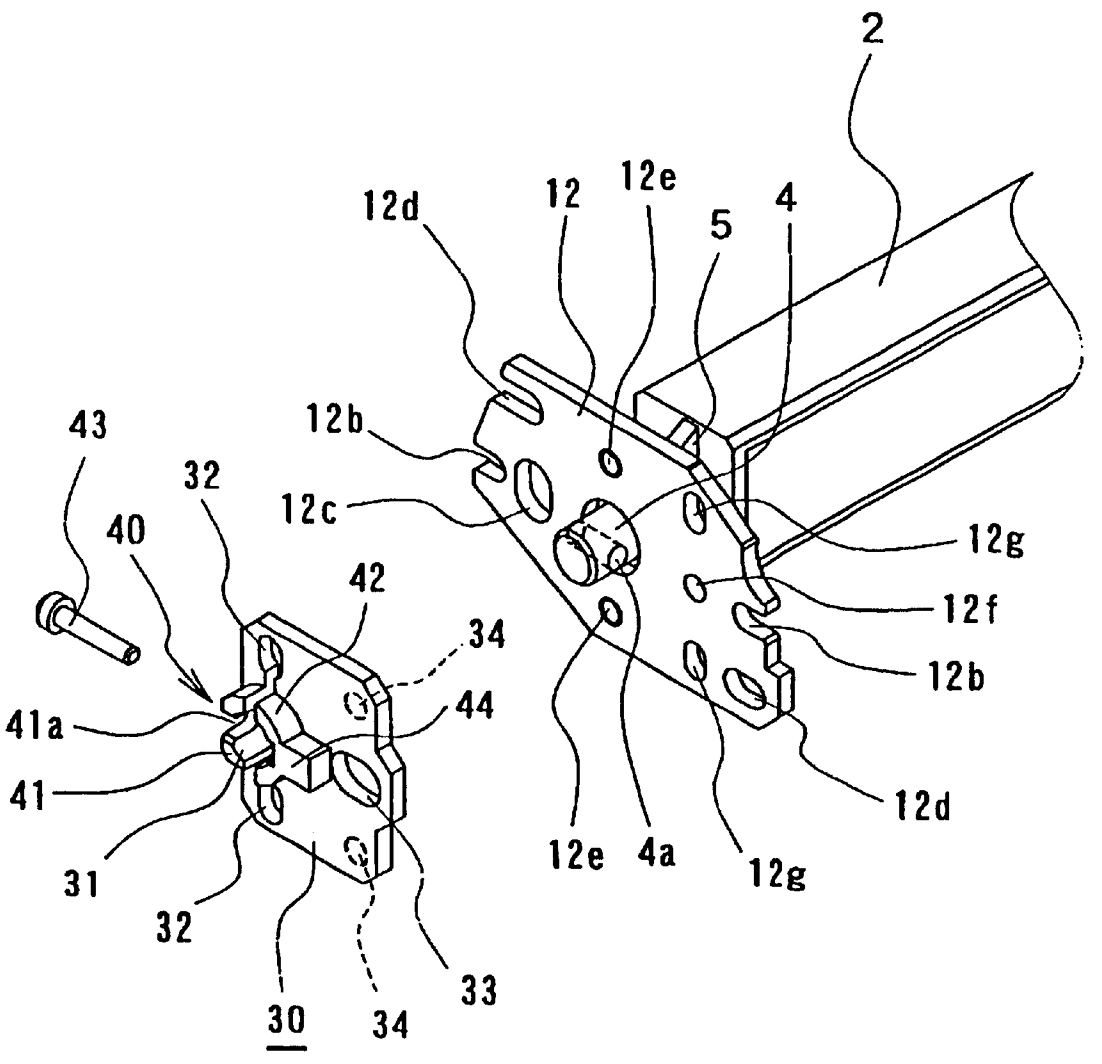
FIG. 4 is a perspective view of one end of the mounting mechanism of FIG. 1 before assembly.

A pedestal 40 is provided on the outer surface of the operational adjuster plate 30 adjacent the receiving hole 31 for pressing contact with bearing shaft 4. As shown in FIGS. 1 and 3 to 6, the pedestal 40 includes two projections 41 and a projection 42 that protrude from the periphery of the receiving hole 31. The projections 41 and 42 are formed as parts of a cylindrical annulus having an inner diameter equal to the bore size of the receiving hole 31. As shown in FIG. 3, a cutout 35 extends diametrically outwardly from the receiving hole 31. A clearance space 41*a* for passing a fixing member such as a fixing screw 43 is provided between the projections 41. As shown in FIG. 3, one of the projections 41 is connected to the main part of the operational adjuster plate 30 so that it may be easily deflected diametrically outwardly by an external force. The projection 42 has a flat part on the inner surface to receive the bearing shaft 4 as is described below. A screw receiving projection 44 for receiving the fixing screw 43 extends diametrically outwardly from the center of the projection 42 and opposite to the clearance space 41*a*. The screw receiving projection 44 includes a threaded hole for mating with the fixing screw 43. The bearing shaft 4 has a through-hole 4*a* to pass the fixing screw 43.

The operation of the mounting mechanism for a strap member, in particular a strap member that is a cylindrical mirror, of the present invention is described below.

The mirror pressing springs 6*a* and 6*b* and the spring pressing projections 6*d* hold the cylindrical mirror 1 housed in the mirror holder 2 in a stable manner. During assembly, the mirror holder 2 is inserted through the through-holes 11*a* of the frames 11 with the bearing shafts 3 and 4 protruding from the frames 11. The reflecting surface of the cylindrical mirror 1 faces approximately in the direction of the line connecting the pair of guide projections 11*b*. The bearing holes 12*a* of the retainer plates 12 receive the parts of bearing shafts 3 and 4 that protrude from the frames 11. The bearing shaft 3 is loosely fitted in the bearing hole 12*a* with clearance for free rotation and the bearing shaft 4 is loosely fitted in the bearing hole 12*a* with substantial play. The guide projections 11*b* protruding from the frame 11 are received in the notches 12*b* of the retainer plates 12. Setscrews 12*h*, shown in FIG. 7, are inserted in the through-parts 12*d* and screwed into threaded holes 11*d* of the frames 11 to connect the retainer plates 12 to the frames 11 so that the guide projections 11*b* engage and remain in the notches 12*b*, but so that further adjustments are possible.

The engaging adjuster plate 20 is mounted on the bearing shaft 3 with the engaging part 3*a* engaged with the notch 21. Setscrews are screwed in the elongated holes 12*g* of the retainer plate 12 through the elongated fixing holes 23 of the engaging adjuster plate 20 to provisionally fix the engaging adjuster plate 20 to the retainer plate 12. A tapered plate 3*c*, shown in FIGS. 1 and 2, is inserted in the axially extending notch 3*b* of the bearing shaft 3 from its end to slightly expand the diameter of the bearing shaft 3 to tighten the connection between the bearing shaft 3 and the engaging adjuster plate 20.

The bearing shaft 4 is fitted in the receiving hole 31 of the operational adjuster plate 30 with the guide projections 34 of the operational adjuster plate 30 inserted in the elongated holes 12*g* of the retainer plate 12. Setscrews 30*a*, shown in FIG. 7, are screwed in the threaded holes 12*e* of the retainer plate 12 through the elongated fixing holes 32 to connect the operational adjuster plate 30 to the retainer plate 12 so that further adjustments are possible. In this state, as is shown in FIG. 7, the guide hole 11*c* of the frame 11 is exposed in the elongated positioning hole 12*c*. The guide hole 12*f* of one retainer plate 12 is exposed in the elongated hole 22 of the engaging adjuster plate 20 and the guide hole 12*f* of the other retainer plate is exposed in the elongated hole 33 of the operational adjuster plate 30.

After the cylindrical mirror 1 is mounted in the frame 11, the place where light is reflected from the cylindrical mirror 1 is adjusted. As is shown in FIG. 8, when the cylindrical mirror 1 is provisionally fixed at a position $S_0$, incident light Li is reflected on the reflecting surface 1*a* and the reflected light $Lo_0$ is reflected to the point T. Assuming that a desired magnification is not obtained at the point T, a magnification adjustment is performed.

The magnification adjustment is performed by sliding the captive retainer plate 12 relatively to the frame 11. An adjusting jig having a body with an eccentric pin at the tip is inserted in the elongated positioning hole 12*c*. The eccentric pin is loosely inserted in the guide hole 11*c* of the frame 11 and the body of the adjusting jig is placed in the elongated positioning hole 12*c*. When the adjusting jig is rotated, the body is pivoted about the eccentric pin and, therefore, a side of the body presses against the inner wall of the elongated positioning hole 12*c*. As the adjusting jig continues to rotate, the retainer plate 12 slides in the direction of the line connecting the guide projections 11*b* of the frame 11. That direction is indicated by the arrows P in FIGS. 1 and 2. Because the captive retainer plate 12 is engaged with the bearing shaft 3, the mirror holder 2 moves in the direction that the retainer plate 12 slides. As a result, the cylindrical mirror 1 moves to the magnifying position $S_1$, to obtain a desired magnification. The direction of movement of the cylindrical mirror 1 is along the line that is normal to the center of the reflecting surface 1*a* and parallel to the line connecting the guide projections 11*b*.

After the cylindrical mirror 1 moves to the magnifying position $S_1$, the setscrew 12*h*, that has not been fully tightened, is further tightened to fix the retainer plate 12 to the frame 11. However, light reflected on the reflecting surface 1*a* will likely not be directed to the point T when the cylindrical mirror 1 is at the magnifying position $S_1$. Therefore, a registering adjustment of the reflecting surface 1*a* of the cylindrical mirror, as set forth below, is needed to reflect the light $Lo_0$ to the point T.

Figure 5:
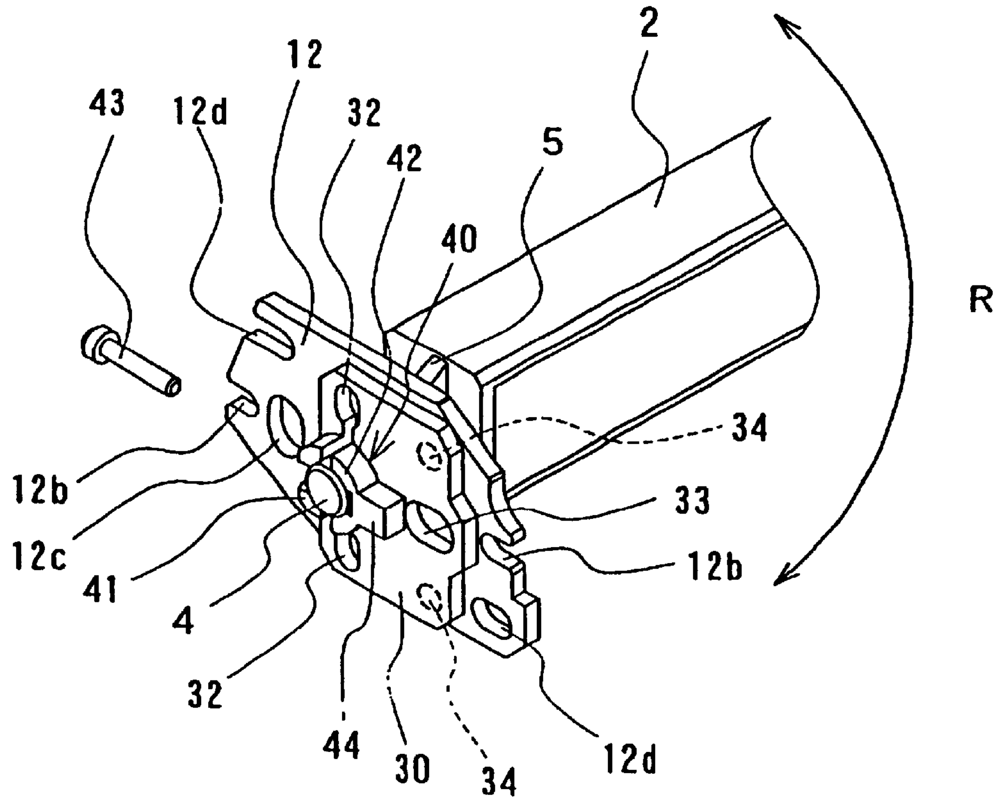
FIG. 5 is a perspective view of the end of the mounting mechanism shown in FIG. 4 partially assembled for adjustments.
Figure 6:
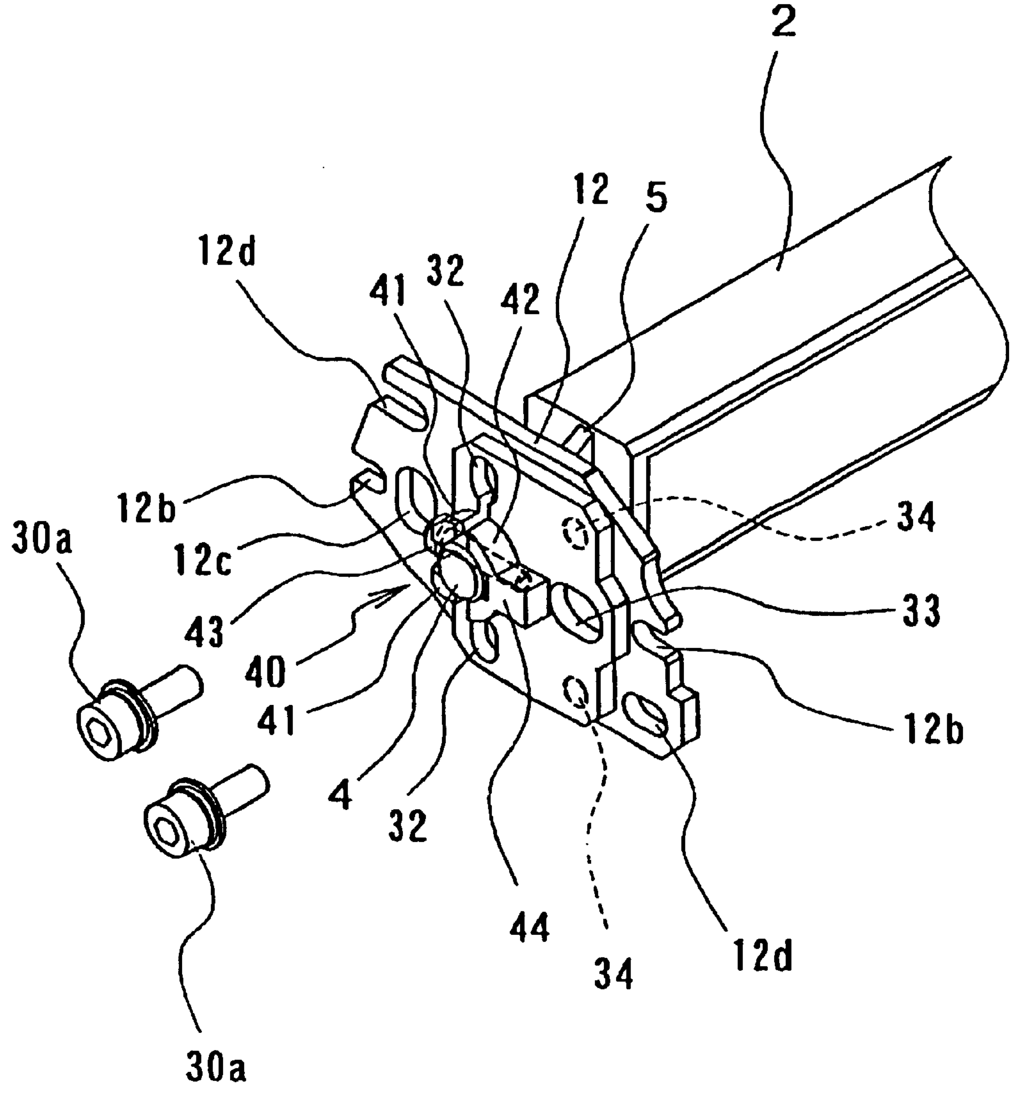
FIG. 6 is a perspective view of parts used to assemble the mounting mechanism end shown in FIG. 4.

In the registering adjustment, an adjusting jig provided with an eccentric pin is inserted into the elongated hole 22 of the engaging adjuster plate 20. The eccentric pin is further inserted into the guide hole 12*f* of the retainer plate 12 and the adjusting jig is rotated. This rotation causes the body of the adjusting jig to press against the inner wall of the elongated hole 22. As the adjusting jig continues to rotate, the engaging adjuster plate 20 is rotated along with the bearing shaft 3 engaged therewith relative to the retainer plate 12 in the direction indicated by the arrow R as is shown in FIGS. 1, 2 and 5. The bearing shaft 4 rotates relative to the retainer plate 12 and the operational adjuster plate 30. The rotation of the bearing shafts 3 and 4 causes the mirror holder 2 to rotate, which in turn causes the cylindrical mirror 1 and the reflecting surface 1*a* to rotate to the scanning position $S_2$, as is shown in FIG. 8. In the scanning position $S_2$, the light $Lo_2$ is reflected to the point T. Then, setscrews which have been loosely screwed to the retainer plate 12, are further tightened in the elongated holes 12*g* to fix the engaging adjuster plate 20 to retainer plate 12.

For a cylindrical mirror 1 that is sufficiently short, mounting and adjustment of the mounting is completed when light is guided to a desired point T with a desired magnification. However, for a cylindrical mirror 1 that is sufficiently long, further adjustment is required to maintain successive scanning lines in the main scanning direction so that scanning lines are not skewed from the desired direction. For example, assuming a desired scanning line is $C_0$, as shown by a solid line in FIG. 9, and that reflected light $Lo_2$ from the cylindrical mirror 1 enters the point T at the middle of the scanning line $C_0$ after the magnification and registering adjustments described above. Even so, the reflected light $Lo_2$ may form a scanning line $C_1$ that is skewed with respect to the desired scanning line. In that case, skew adjustment is required to correct the scanning line.

For skew adjustment, an adjusting jig having an eccentric pin is inserted in the elongated hole 33 of the operational adjuster plate 30 and the eccentric pin is placed in the guide hole 12*f* of the retainer plate 12. When the adjusting jig is rotated, the body is pivoted about the eccentric pin, and therefore, a side of the body presses against the inner wall of the elongated hole 33. Due to the setscrews 30*a* passing through the elongated fixing holes 32 and being threaded in the threaded holes 12*e* formed in the retainer plate 12, further rotation of the adjusting jig causes the operational adjuster plate 30 to slide in the direction of alignment of the lengthwise direction of threaded holes 12*e*, as indicated by the arrow Q in each of FIGS. 1 and 2. This sliding direction is orthogonal to the sliding direction of the retainer plate 12 during magnification adjustment.

Figure 9:
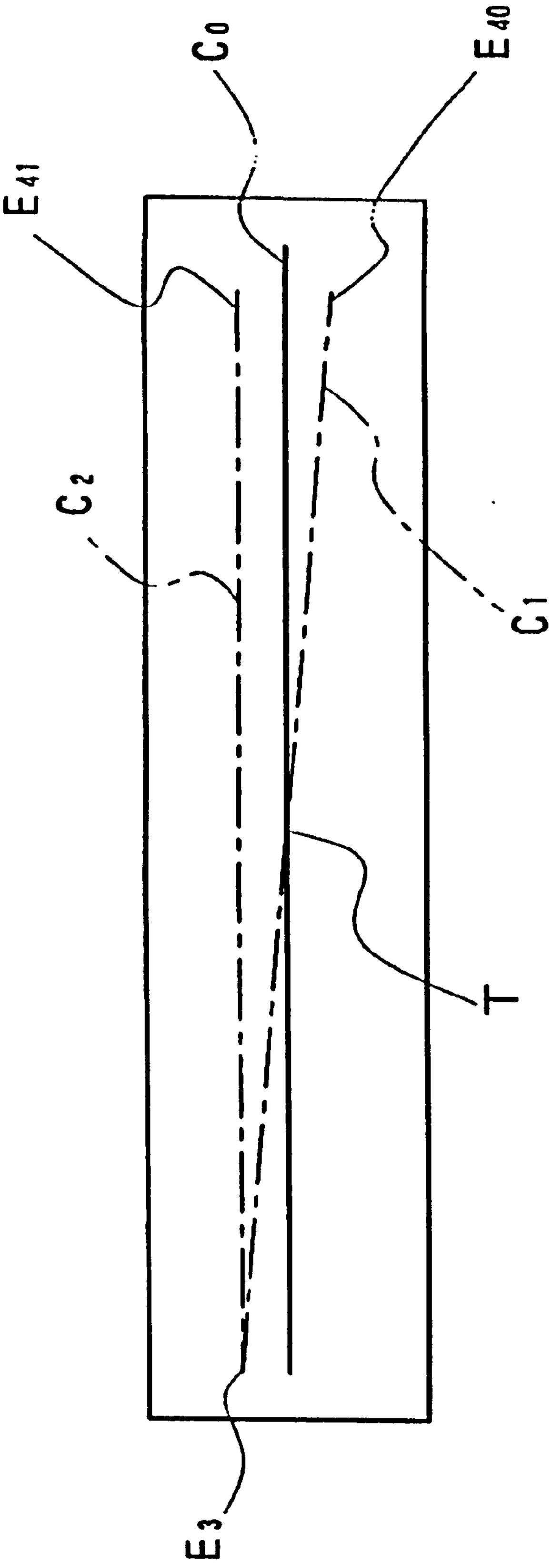
FIG. 9 is an illustration showing an adjustment process that adjusts a main scanning line for reproducing images.

The bearing shaft 4 is fitted in the receiving hole 31 of the operational adjuster plate 30 through the bearing hole 12*a* of the retainer plate 12 with biasing by the projections 41 and 42 engaging the bearing shaft. As the operational adjuster plate 30 slides, the engaged bearing shaft moves. This changes the relative positions of the bearing shafts 3 and 4. As shown in FIG. 9, by changing the relative positions, the end $E_{40}$ of the scanning line $C_1$ that is on the bearing shaft 4 side can be raised to the position $E_{41}$ that is on about the same level as the end $E_3$ of the scanning line that is on the bearing shaft 3 side. After this adjustment, the scanning line $C_2$ is about parallel to the scanning line $C_0$. After the scanning line $C_2$ is obtained, the setscrews 30*a*, which have been previously screwed into threaded holes 12*e*, are tightened to fix the operational adjustment plate 30 to the retainer plate 12.

Next, another registering adjustment is made by loosening setscrews 20*a* and rotating the engaging adjuster plate 20 relative to the retainer plate 12 in order to change the orientation of the reflecting surface 1*a* of the cylindrical mirror 1 as described above, so that the scanning line $C_2$ coincides with the scanning line $C_0$. Then, the setscrews 20*a* are again tightened to fix the engaging adjuster plate 20 to the retainer plate 12. Then the fixing screw 43 is inserted in the though-hole 4*a* formed in the bearing shaft 4, and the fixing screw 43 is screwed and tightened into a threaded hole (not shown) in the screw receiving projection 44 formed on the projection 42. This deflects a projection 41 to clamp the bearing shaft 4 between projections 41 and 42 so as to fix the bearing shaft 4 relative to the operational adjuster plate 30. At this time, the mounting and adjustment of the cylindrical mirror 1 is completed, and thus reflected light $Lo_2$ from the cylindrical mirror 1 can be used for scanning along a desired scanning line $C_0$. With the bearing shaft 4 fixed with the fixing screw 43, the cylindrical mirror 1 stably reflects light even with vibrations and heat produced during the operation of the optical reproductive scanning apparatus in which the cylindrical mirror 1 is mounted.

In the embodiment described above, magnification is adjusted by sliding the retainer plate 12 relative to the frame 11 and, accordingly, moving the cylindrical mirror 1 in the direction of the normal of the reflecting surface 1*a*. Consequently, the point at which light Li is reflected from the cylindrical mirror 1 in the magnifying position $S_1$ shifts from that in the magnifying position $S_0$ as is shown in FIG. 8. This shift may cause the point of reflection not to fall on the reflecting surface 1*a* of the cylindrical mirror 1 during subsequent registering and skew adjustments. To avoid this result, the cylindrical mirror 1 is moved in the direction orthogonal to the normal to the reflecting surface 1*a* to maintain the point of reflection approximately at the center of the reflecting surface 1*a*. With the optical path of the incident light Li as previously specified, the cylindrical mirror 1 can be moved in the direction of incident light Li to place the point of reflection at the center of the reflecting surface 1*a*. In other words, the direction of the line connecting a pair of guide projections 11*b* protruding from the frame 11 is coincident with the direction of incident light Li. For color image forming apparatuses in which plural cylindrical mirrors 1 are used, magnification adjustments can be performed by moving the mirrors in a direction that is normal to the reflection surface. This allows identical retainer plates 12 to be used for all the cylindrical mirrors, which is preferable in regards to utilizing common parts.

When the strap member is a flat mirror, or a cylindrical mirror that is sufficiently short as set forth previously, a skew adjustment in which the relative positions of both ends of the mirror are adjusted is not required. Therefore, the operational adjuster plate 30 can be omitted and the bearing shaft 4 supported for free rotation and fixed after the magnification and registering adjustments.

As described above, the mounting mechanism for a strap member according to the present invention uses a case in which the strap member is housed. Therefore, forces for mounting and adjusting a strap member are not directly applied to the strap member. This helps prevent twisting and bending distortions of the strap member caused by vibrations and heat during adjustments and operations, helps ensure stable operation of the strap member, and enables independent magnification, skew, and registering adjustments. Thus, when the strap member is a scanning mirror, the present invention enables stable, predetermined scanning to be performed.

The invention being thus described, it will be obvious that the same may be varied in many ways. For example, as an alternative to the embodiment described above which uses a single mirror holder 2, the cylindrical mirror 1 can be provided with a mirror holder at each end with bearing shafts similar to the bearing shafts 3 and 4. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A mounting mechanism for a strap member in which the strap member is supportable at both ends with the orientation of at least a surface of the strap member being adjustable, the mounting mechanism comprising:

a case for housing the strap member, the case having a lengthwise direction, two ends separated in the lengthwise direction, and at least one open side between the two ends for exposing a surface of the strap member in the open side;

a bearing shaft at each end of the case, each bearing shaft extending in the lengthwise direction of the case;

a retainer plate at each end of the case, each retainer plate including a through-hole for receiving one of the bearing shafts with the bearing shafts extending outwardly from the retainer plates, the bearing shafts being loosely fitted in the through-holes in a manner so that the bearing shafts are free to rotate in the through-holes, and one of the bearing shafts being loosely fitted with substantial play between the bearing shaft and its associated through-hole so that the bearing shaft may be biased to different positions in the through-hole;

adjuster plates at each end of the case for adjusting the positions of the bearing shafts, each of the adjuster plates receiving a part of a bearing shaft that protrudes outwardly from a retainer plate;

a through-hole orthogonal to the axial direction of the bearing shafts in at least one of the bearing shafts that protrudes outwardly from a retainer plate;

a fixing member for insertion in the orthogonal through-hole; and an engaging part formed in the adjuster plate for engaging with the fixing member when the fixing member is inserted in the orthogonal through-hole and into at least a part of the engaging part;

wherein the adjuster plates are movable relative to the retainer plates to shift the bearing shafts in at least one direction generally orthogonal to the lengthwise direction of the case, and at least one of the adjuster plates is adjustable in rotation angle about a bearing shaft relative to an associated retainer plate.

2. The mounting mechanism of claim 1, wherein the fixing member is a fixing screw.

3. The mounting mechanism of claim 2, wherein the part of the engaging part for engagement with the fixing member is a projection with at least a portion for receiving the fixing screw.

4. The mounting mechanism of claim 1, wherein the part of the engaging part for engagement with the fixing member is a projection with at least a portion for receiving the fixing member.

5. The mounting mechanism of claim 1, wherein the engaging part is also for engaging the bearing shaft and includes a receiving hole for receiving a bearing shaft and a supporting surface at the receiving hole for supporting the bearing shaft.

6. The mounting mechanism of claim 1, in combination with a strap member.

7. The combination of claim 6, wherein the strap member is a mirror.

8. The combination of claim 7, wherein the mirror is a cylindrical mirror.

9. In combination, a mirror and a mounting mechanism for adjustment of the orientation of the mirror, the mirror having an elongated surface, and the mounting mechanism comprising:

a frame in which the mirror is housed, the frame including frame surfaces;

a mirror case having at least one open side that houses the mirror with its reflecting surface exposed in the open side;

bearing shafts provided at both ends of the mirror case extending and aligned in the direction of elongation of the elongated mirror;

a retainer plate at each end loosely fitted on each of the bearing shafts;

an adjuster plate at each end linked to the part of each bearing shaft that protrudes outwardly from a retainer plate;

a through-hole orthogonal to the axial direction of the bearing shafts in a part of at least one of the bearing shafts that protrudes outwardly from a retainer plate;

a fixing member for insertion in the through-hole; and an engaging part formed in the adjuster plate for engaging with the fixing member when the fixing member is inserted in the through-hole and into at least a part of the engaging part;

wherein the adjuster plates are mounted in a manner so that they are free to slide relative to the frame surfaces on which the mirror is mounted in a direction orthogonal to the direction of elongation of the elongated mirror and relative to the retainer plates in a direction orthogonal to the slide direction, and so that the mirror case is free to rotate about the bearing shafts.

10. The combination of claim 9, wherein the mirror is a cylindrical mirror.

11. The combination of claim 10, wherein:

both of the retainer plates are free to slide relative to the frame in the direction of a normal to the reflecting surface of the cylindrical mirror;

one of the retainer plates is a captive retainer plate that is loosely fitted on a bearing shaft to allow rotation of the bearing shaft relative to the captive retainer plate;

the adjuster plate provided outside the captive retainer plate is an engaging adjuster plate that is detachably engaged with the bearing shaft, the engaging adjuster plate being rotatable relative to the captive retainer plate so that the mirror case is rotatable with the engaging adjuster plate about a bearing shaft;

the other adjuster plate being an operational adjuster plate that is loosely fitted on a bearing shaft with appropriate play so that the bearing shaft and the operational adjuster plate may be shifted relative to one another by biasing forces applied to the bearing shaft;

the through-hole is in a bearing shaft part that protrudes outwardly from the retainer plate that is not the captive retainer plate;

the engaging part is formed on the operational adjuster plate; and the operational adjuster plate is mounted in a manner so that it is free to slide relative to the retainer plate that is not the captive retainer plate in a direction orthogonal to a normal to the reflecting surface of the cylindrical mirror.

12. The combination of claim 11, wherein the mirror is a cylindrical mirror.

13. The combination of claim 9, wherein the fixing member is a fixing screw.

14. The combination of claim 11, wherein the fixing member is a fixing screw.

15. The combination of claim 9, wherein the part of the engaging part for engagement with the fixing member is a projection with at least a portion for receiving the fixing screw.

16. The combination of claim 11, wherein the part of the engaging part for engagement with the fixing member is a projection with at least a portion for receiving the fixing member.

17. The combination of claim 9, wherein the engaging part is also for engaging the bearing shaft and includes a receiving hole for receiving a bearing shaft and a supporting surface at the receiving hole for supporting the bearing shaft.

18. The combination of claim 10, wherein the engaging part is also for engaging the bearing shaft and includes a receiving hole for receiving a bearing shaft and a supporting surface at the receiving hole for supporting the bearing shaft.

19. The combination of claim 11, wherein the engaging part is also for engaging the bearing shaft and includes a receiving hole for receiving a bearing shaft and a supporting surface at the receiving hole for supporting the bearing shaft.

20. The combination of claim 12, wherein the engaging part is also for engaging the bearing shaft and includes a receiving hole for receiving a bearing shaft and a supporting surface at the receiving hole for supporting the bearing shaft.

* * * * *